United States Patent
Buñuel Magdalena et al.

(10) Patent No.: US 9,534,793 B2
(45) Date of Patent: Jan. 3, 2017

(54) HOUSEHOLD APPLIANCE

(75) Inventors: Miguel Angel Buñuel Magdalena, Saragossa (ES); Diego Dionisio Micolau, Saragossa (ES); Andres Escartin Barduzal, Saragossa (ES); Francisco Javier Ester Sola, Saragossa (ES); Rosa Isabel Merino Rubio, Saragossa (ES); Pilar Perez Cabeza, Saragossa (ES); Fernando Planas Layunta, Saragossa (ES); Demetrio Torrubia Marco, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 294 days.

(21) Appl. No.: 13/521,758

(22) PCT Filed: Jan. 12, 2011

(86) PCT No.: PCT/IB2011/050128
§ 371 (c)(1),
(2), (4) Date: Jul. 12, 2012

(87) PCT Pub. No.: WO2011/086504
PCT Pub. Date: Jul. 21, 2011

(65) Prior Publication Data
US 2013/0161318 A1    Jun. 27, 2013

(30) Foreign Application Priority Data

Jan. 13, 2010 (ES) .................. 201030021

(51) Int. Cl.
*F24C 15/10* (2006.01)
*H05B 6/12* (2006.01)
(Continued)

(52) U.S. Cl.
CPC .......... *F24C 15/102* (2013.01); *H05B 6/1218* (2013.01); *A47J 36/02* (2013.01); *H05B 6/062* (2013.01)

(58) Field of Classification Search
CPC ............ H05B 6/062; H05B 6/12; A47J 36/02; A47J 27/002
(Continued)

(56) References Cited

U.S. PATENT DOCUMENTS 4,983,810 A    1/1991  Balderson
5,643,485 A *  7/1997  Potter et al. .................. 219/621
(Continued)

FOREIGN PATENT DOCUMENTS

DE         10122210 A1    11/2002
DE    102005025896 A1 *  11/2006
(Continued)

OTHER PUBLICATIONS

International Search Report PCT/IB2011/050128.

*Primary Examiner* — Dana Ross
*Assistant Examiner* — Kuangyue Chen
(74) *Attorney, Agent, or Firm* — Michael E. Tschupp; Andre Pallapies

(57) ABSTRACT

A household appliance, in particular a cooking hob device, includes at least one thermochromic and/or thermoluminescent element that contains at least one vanadium-containing material. The material containing vanadium can be a semiconductor in at least one temperature range, e.g. a doped semiconductor in the temperature range, and may include vanadium dioxide.

37 Claims, 2 Drawing Sheets

(51) Int. Cl.
*A47J 36/02* (2006.01)
*H05B 6/06* (2006.01)

(58) Field of Classification Search
USPC .............................. 219/621, 620, 622, 623
See application file for complete search history.

(56) References Cited

U.S. PATENT DOCUMENTS

| | | | | |
|---|---|---|---|---|
| 6,037,572 | A | * | 3/2000 | Coates et al. .............. 219/451.1 |
| 6,930,289 | B2 | * | 8/2005 | Siebers et al. ........... 219/452.11 |
| 8,127,571 | B2 | * | 3/2012 | Martin et al. ................. 65/134.1 |
| 2005/0006379 | A1 | * | 1/2005 | Sullivan ....................... 219/620 |

FOREIGN PATENT DOCUMENTS

| | | | |
|---|---|---|---|
| DE | 102007061272 A1 | | 6/2009 |
| JP | 2005302633 A | * | 10/2005 |
| JP | 2007178224 A | | 7/2007 |
| JP | 2008297177 A | * | 12/2008 |

\* cited by examiner

HOUSEHOLD APPLIANCE

BACKGROUND OF THE INVENTION

A household appliance apparatus having a cooking region, which features a thermochromic element, which indicates that a surface is hot during an operating process, is known from the publication DE 38 73 590 T2.

A cooktop with thermochromic elements, which are in each instance disposed adjacent to a cooking zone when the cooktop is viewed from above, is known from the publication DE 101 22 210 A1.

BRIEF SUMMARY OF THE INVENTION

The object of the invention is in particular to provide a generic apparatus with improved characteristics in respect of a high level of efficiency. According to the invention the object is achieved by the features of claim 1, while advantageous embodiments and developments of the invention can be found in the subclaims.

A household appliance apparatus is proposed, in particular a cooktop apparatus, having at least one thermochromic and/or thermoluminescent element, which features at least one material containing vanadium. A "thermochromic" element refers in particular to an element which has the characteristic of thermochromy. A "thermoluminescent" element refers in particular to an element, which has the characteristic of thermoluminescence. A "material containing vanadium" refers in particular to a material, which contains vanadium atoms and/or vanadium ions and/or at least one vanadium compound. A high level of efficiency can be achieved with an inventive embodiment. It is possible in particular to produce the household appliance apparatus efficiently. In particular it is possible to connect the thermochromic and/or thermoluminescent element to at least one other component in a simple manner. It is possible in particular, during an operating process in which cookware is heated, for at least a significant part of heat radiation to be reflected and/or absorbed by the thermochromic and/or thermoluminescent element, thereby shielding electronic components of the household appliance apparatus from said heat radiation.

It is further proposed that the material containing vanadium should be a semiconductor in at least one temperature range. This allows a user-friendly visual response of the material containing vanadium to be achieved. In particular it is possible for the material containing vanadium to be transparent at room temperature.

The material containing vanadium is preferably a doped semiconductor in the temperature range. This allows a sensitive visual response to be achieved as a function of a temperature of the material containing vanadium. In particular specific doping of the semiconductor can determine a temperature at which the material containing vanadium changes color.

It is also proposed that the material containing vanadium features vanadium dioxide. This means that the material containing vanadium is opaque at high temperatures, allowing electronic components of the household appliance apparatus to be protected against heat radiation.

The material containing vanadium advantageously extends over at least a majority of an overall cooking zone surface. An "overall cooking zone surface" refers in particular to the combination of all the surfaces belonging to a cooking zone. A "cooking zone" refers in particular to a surface region of a cooktop apparatus, which is provided for the simultaneous positioning of a single cookware element to be heated and which is marked for the positioning of cookware. A "majority" of the overall cooking zone surface refers in particular to at least fifty percent, preferably at least seventy percent and particularly preferably at least ninety percent of the overall cooking zone surface. "Provided" means in particular specifically designed and/or specifically equipped. This allows a comfortable level of user-friendliness to be achieved. In particular a user can identify the cooking zone in a simple manner.

The material containing vanadium preferably extends over at least a significant part of a main cookware support surface. A "main cookware support surface" refers in particular to a surface of a cooktop which is provided for the positioning of cookware and which is preferably a face of a single component, the component preferably being configured as a single piece, and the surface preferably being different from a surface of a warming plate. The fact that the component is configured "as a single piece" means in particular that it is produced in one injection and/or casting process and has to be destroyed to be split. A "significant part" of a main cookware support surface refers in particular to at least twenty percent, preferably at least fifty percent and particularly preferably at least seventy percent of the main cookware support surface. This allows heated surface regions to be identified easily.

It is also proposed that the thermochromic and/or thermoluminescent element is provided to make at least part of a hot region outline visible. A "hot region outline" here refers in particular to a separating line, which separates a heated surface region from an essentially unheated surface region, the separating line preferably forming an edge region of the two surface regions respectively. An "essentially unheated" surface region refers in particular to a surface region, the temperature of which deviates as a maximum fifty percent, preferably as a maximum twenty percent and particularly preferably as a maximum two percent from a room temperature, which is in particular 20° C., and/or deviates from an ambient temperature, the temperatures preferably being measured in ° C., and/or which is lower than a temperature, at which the thermochromic element changes color when heated. A "heated" surface region refers in particular to a surface region which has a higher temperature than an unheated surface region, the temperature preferably being higher than a temperature, at which the thermochromic element changes color when heated, heat preferably being supplied to the surface region from at least one heating means of the household appliance apparatus to reach its temperature. This allows a comfortable level of user-friendliness to be achieved. It is possible in particular for a user to distinguish particularly easily between heated and unheated regions.

The household appliance apparatus preferably has a structural element which has a face which is a main cookware support surface of a cooktop, which is provided for the simultaneous positioning of a number of cookware elements and the majority of which at least is a cookware heating zone. A "cookware heating zone" refers in particular to a partial surface of the main cookware support surface, on which cookware regions, which can be present in any part of the partial surface, are heated directly by a heating means of the household appliance apparatus. The ability of a cookware region to be heated "directly" by a heating means refers in particular to the fact that a magnetic field generated by the heating means can produce eddy currents in the cookware region, which are suitable to heat points of the cookware region to at least 100° C. and/or that radiation emitted by the heating means can strike the cookware region directly and/or that the heating means can heat the cookware region by material heat transfer to at least 100° C. This makes the structure of the household appliance apparatus user-friendly. In particular it is possible to position cookware on the cookware heating zone easily and conveniently.

The household appliance apparatus advantageously has at least one upper visible unit, which is free of cooking zone markings in at least one ready-to-operate state. An "upper visible unit" of the household appliance apparatus refers in particular to a structural unit of the household appliance apparatus, which features all the components which are visible in at least one operating state when the household appliance apparatus and preferably a household appliance featuring the household appliance apparatus are viewed from above. A "cooking zone marking" refers in particular to a marking, which is provided to mark a partial region of the main cookware support surface, which is provided for the preferred positioning of cookware to be heated, the marking preferably being at least one separating line between a cooking zone and a region disposed outside all the cooking zones and the marking preferably being formed at least partially by printing. This allows a high level of flexibility. It is possible in particular to use cookware heating zones in a flexible manner.

It is also proposed that the thermochromic and/or thermoluminescent element has a first and at least a second main face, at least a majority of which in at least one operating state rests in each instance against at least one further element. A "main face" of the thermochromic and/or thermoluminescent element refers in particular to a face of the thermochromic and/or thermoluminescent element, which has a larger surface than a certain number of faces of the thermochromic and/or thermoluminescent element respectively, the certain number of faces being a total number of faces of the thermochromic and/or thermoluminescent element minus two. The fact that "at least a majority" of a main face rests against a further element means in particular that at least fifty percent, preferably at least seventy percent and particularly preferably at least ninety percent of an overall surface of the main face rests against the further element. This makes the structure robust. Reliable protection on the part of the thermochromic and/or thermoluminescent element in particular can be achieved.

The household appliance apparatus preferably has at least one element containing silicon, which is connected in a material manner to the thermochromic and/or thermoluminescent element. The fact that the element containing silicon is connected "in a material manner" to the thermochromic and/or thermoluminescent element means in particular that the element containing silicon and the thermochromic and/or thermoluminescent element are connected to one another with a material bond and/or that there is at least one solid unit fastening the element containing silicon to the thermochromic and/or thermoluminescent element. This means that the design of the structure is simple.

A household appliance production method, in particular for producing a household appliance apparatus, is also proposed, in which at least one thermochromic and/or thermoluminescent material is applied to a least one component at least by sputtering. This allows a high level of efficiency to be achieved. In particular it allows efficient and in particular simple production of the household appliance apparatus.

Further advantages will emerge from the description of the drawing which follows. The drawing shows exemplary embodiments of the invention. The drawing, description and claims contain numerous features in combination. The person skilled in the art will expediently also consider the features individually and combine them to form meaningful further combinations.

DETAILED DESCRIPTION OF EXEMPLARY EMBODIMENTS OF THE PRESENT INVENTION

Figure 1:
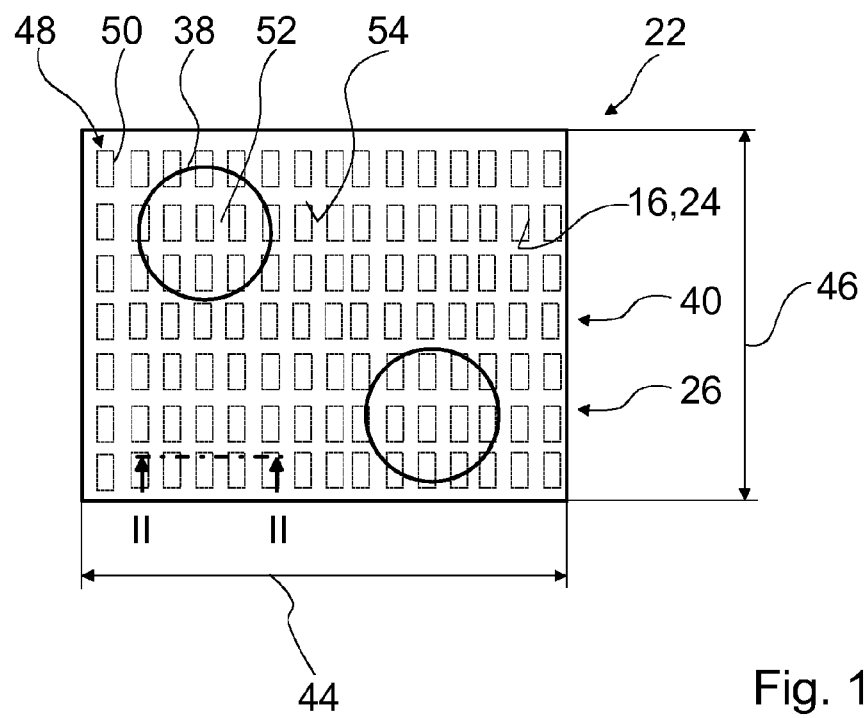
FIG. 1 shows a plan view of a cooktop having an inventive cooktop apparatus.
Figure 2:
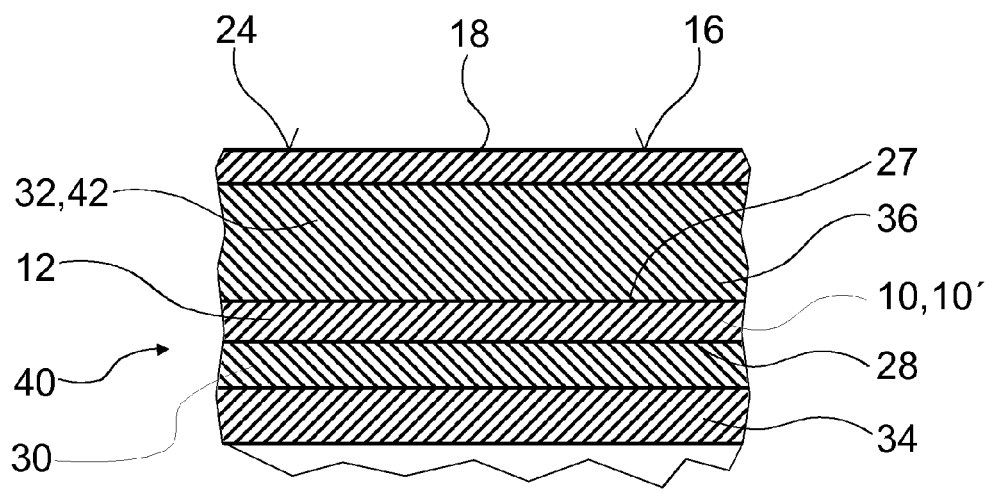
FIG. 2 shows a section II-II through a layered unit of the cooktop apparatus.

FIG. 1 shows a plan view of a cooktop 22 configured as an induction cooktop, having a cooktop apparatus in an operating state. The cooktop apparatus has a main cookware support surface 16, which is provided for the positioning of a number of and in particular four pots. The main cookware support surface 16 is an upper face of a rectangular layered unit 40 (FIGS. 1 and 2), which has a glass ceramic plate 42, which extends over an entire length 44 and an entire width 46 of the cooktop apparatus. The layered unit 40 also has a layer 10' of a material 12 containing vanadium, which likewise extends over an entire length 44 and an entire width 46 of the cooktop apparatus, is disposed beneath the glass ceramic plate 42 in the operating state and covers a lower face of the glass ceramic plate 42 completely so that the material 12 containing vanadium extends over the entire main cookware support surface 16 and is disposed at a distance from the main cookware support surface 16. The layer 10' forms a thermochromic element 10 and is formed from vanadium dioxide, which is a semiconductor and transparent below 68° C. An upper visible unit 26 of the cooktop apparatus, which is visible in FIG. 1, is free of cooking zone markings and has a uniform color when the cooktop 22 is ready to operate after a long period of non-use. The cooktop 22 is also free of printing with circular lines marking cooking regions. The layered unit 40 also has a structural element 18 configured as a layer, which forms the main cookware support surface 16 and which is applied to the glass ceramic plate 42 by screen printing. The structural element 18 is formed from ceramic material. In principle it is also conceivable for the structural element 18 to be absent and for the glass ceramic plate 42 to form the main cookware support surface 16. In principle it is conceivable for the structural element 18 to have one or more markings, which mark cookware positioning regions.

The main cookware support surface 16 is also a cookware heating zone 24. To this end the cooktop apparatus has a heating unit 48, with coils 50 disposed in a matrix. The coils 50 can be used to heat cookware for a cooking process, regardless of where the cookware is positioned on the main cookware support surface 16.

The thermochromic element 10 is provided to make a hot region outline 38 of a heated upper face region 52 of the layered unit 40 visible. When a heated pot, which was heated on the upper face region 52, is removed from the layered unit 40, a color, in which the upper face region 52 appears to a user, is different from a color in which a region 54 appears, which surrounds the upper face region 52, when a region of the element 10 disposed beneath the upper face region 52 was heated to over 68° C., in particular when heated by heat transfer. Said region of the element 10 in this instance is opaque and darker than a region of the element 10 surrounding it, making the hot region outline 38 visible. When a pot is disposed on the heated upper face region 52, because said region of the element 10 is opaque, only a small quantity of heat radiation can pass from a lower face of the pot to an electronic system of the cooktop apparatus, because a majority of the heat radiation is reflected or absorbed by said region of the element 10.

In the operating state an upper face and a lower face of the element 10 form two main faces 27, 28 of the element 10, The main face 27, which is the upper face, is fastened with a material bond to the lower face of the element 32, specifically the glass ceramic plate 42, and therefore rests against this in its entirety. The main face 28 is fastened with a material bond to a further element 30 of the layered unit 40, which is a layer, and rests against this in its entirety. The element 30 is metallic and is applied by sputtering. In principle the element 30 can be formed by an organic and/or ceramic color. The cooktop apparatus also has an element 34 configured as a protective layer, which is fastened with a material bond to the element 30 and is formed by a color containing silicon. The element 34 extends over the entire main cookware support surface 16, being disposed at a distance therefrom.

During production of the cooktop apparatus the element 10 is applied by sputtering to a component 36, and specifically to the glass ceramic plate 42. In principle it is conceivable for the element 10 also to be applied using a printing technique, in particular by screen printing. In this process thermochromic and/or thermoluminescent materials are introduced into ceramic materials and then printed. It is in particular conceivable, when applying the element 10 by printing and in particular by screen printing, for the element 10 produced to have a pattern. It is further conceivable to configure the cooktop apparatus without the element 30. It is also conceivable to add a further screen printed element to the layered unit 40.

In principle it is also conceivable for the element to be made of doped vanadium dioxide, for example vanadium dioxide doped with 1.9% tungsten. If the element is made of vanadium dioxide doped with 1.9% tungsten, when heated to a temperature around 29° C. the element changes from a semiconductor to a metal. In principle it is also conceivable for the element to be thermoluminescent instead of thermochromic. In principle it is conceivable for the element 10 to be applied by screen printing or sputtering, if it is thermoluminescent instead of thermochromic.

In principle it is conceivable for the element 10, which is configured as a layer, to have different thicknesses at different points. This allows the different points to be distinguished from one another, in particular when viewed from above. In particular the different points can be distinguished from one another if they have identical temperatures.

The glass ceramic plate 42 has a thickness of 4 mm, the element 10 a thickness of 5 to 250 nm and the element 34 a thickness of 0.1 to 1 mm.

Figure 3:
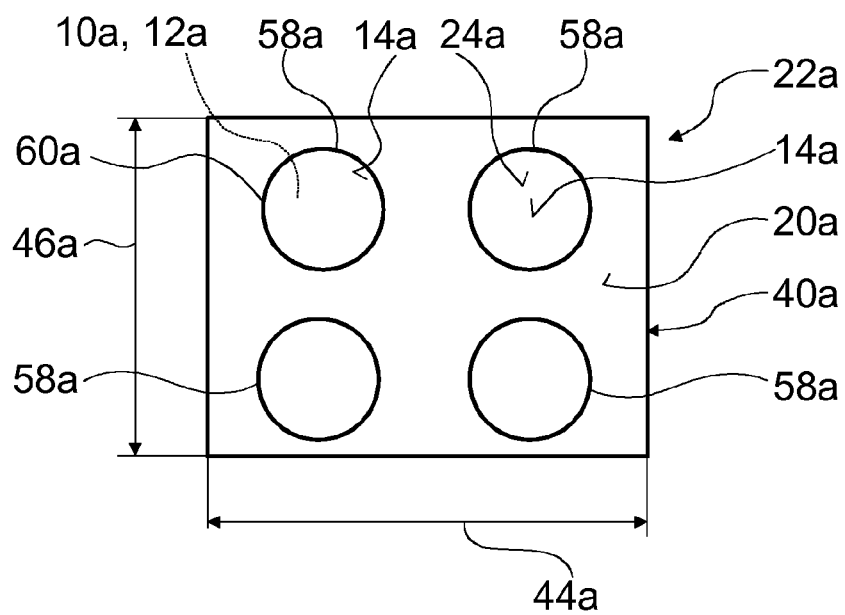
FIG. 3 shows a plan view of an alternative exemplary embodiment of a cooktop, which features different cooking zones.

FIG. 3 shows an alternative exemplary embodiment. Essentially identical components, features and functions are in principle shown with identical reference characters. However to distinguish the exemplary embodiments the letter "a" is appended to the reference characters of the exemplary embodiment in FIG. 3. The description which follows is essentially restricted to the differences compared with the exemplary embodiment in FIGS. 1 and 2, it being possible to refer to the description of the exemplary embodiment in FIGS. 1 and 2 in respect of identical components, features and functions.

FIG. 3 shows a plan view of a cooktop 22a having an alternative configuration of a cooktop apparatus. The cooktop 22a includes an upper visible unit 20a. Similar to the exemplary embodiments in FIGS. 1 and 2, the exemplary embodiment in FIG. 3 includes a layered unit 40a having a layer 10a of a material 12a containing vanadium, a cookware heating zone 24a. The cooktop apparatus has four circular cooking zones 58a, which are marked by screen printed markings 60a, which are disposed on an upper face of the cooktop apparatus and are applied to a glass ceramic plate 42 of the cooktop apparatus. A heating apparatus of the cooktop apparatus has four radiant heating units (not shown), each of which in the operating state is disposed beneath one of the cooking zones 58a and which are provided to heat cookware disposed on the respective cooking zone 58a. The cooktop apparatus has four thermochromic elements 10a, each of which is disposed beneath a surface of one of the cooking zones 58a. The elements 10a also only extend over an entire overall cooking zone surface 14a of one of the cooking zones 58a in each instance, not beyond. In principle it is also conceivable for the element 10 to extend over an entire length 44a and an entire width 46a of the cooktop apparatus and be configured in a rectangular manner when viewed from above.

REFERENCE CHARACTERS

10 Element
10' Layer
12 Material
14 Overall cooking zone surface
16 Main cookware support surface
18 Structural element
22 Cooktop
24 Cookware heating zone
26 Visible unit
27 Main face
28 Main face
30 Element
32 Element
34 Element
36 Component
38 Hot region outline
40 Layered unit
42 Glass ceramic plate
44 Length
46 Width
48 Heating unit
50 Coil
52 Upper face region
54 Region
58 Cooking zone
60 Screen printed marking

The invention claimed is:

1. A household appliance apparatus, comprising a layered structure including:
at least one member selected from the group consisting of a thermochromic element and a thermoluminescent element, said member having at least one material containing vanadium,
wherein the member has a first main face and at least a second main face, each of the first and second main faces at least predominantly resting against at least one further element in at least one operating state; and a structural element having a face which is a main cookware support surface of a cooktop for positioning a number of cookware elements, wherein the at least one further element includes a glass ceramic plate that is disposed beneath the main cookware support surface and that extends under an overall area of the main cookware support surface when viewed from above, and wherein the member is disposed beneath the glass ceramic plate and the at least one material containing vanadium extends under at least fifty percent of the overall area of the main cookware support surface when viewed from above to thereby render at least part of a hot region outline visible over at least a significant part of the main cookware support surface and to shield electronic components, which are disposed under the layered structure, from heat radiation from the hot region.

2. The household appliance apparatus of claim 1, constructed in the form of a cooktop apparatus.

3. The household appliance apparatus as of claim 1, wherein the material containing vanadium is a semiconductor in at least one temperature range.

4. The household appliance apparatus as of claim 3, wherein the material containing vanadium is a doped semiconductor in the temperature range.

5. The household appliance apparatus as of claim 1, wherein the material containing vanadium includes vanadium dioxide.

6. The household appliance apparatus as of claim 1, wherein the main cookware support surface is configured to at least predominantly form a cookware heating zone.

7. The household appliance apparatus as of claim 1, further comprising at least one upper visible unit, which is free of cooking zone markings in at least one ready-to-operate state.

8. The household appliance apparatus as of claim 1, further comprising at least one element containing silicon, which is connected in a material manner to the member.

9. A household appliance, comprising a household appliance apparatus comprising a layered structure including:

at least one member selected from the group consisting of a thermochromic element and a thermoluminescent element, said member having at least one material containing vanadium, wherein the member has a first main face and at least a second main face, each of the first and second main faces at least predominantly resting against at least one further element in at least one operating state; and a structural element having a face which is a main cookware support surface of a cooktop for positioning a number of cookware elements, wherein the at least one further element includes a glass ceramic plate that is disposed beneath the main cookware support surface and that extends under an overall area of the main cookware support surface when viewed from above, and wherein the member is disposed beneath the glass ceramic plate and the at least one material containing vanadium extends under at least fifty percent of the overall area of the main cookware support surface when viewed from above to thereby render at least part of a hot region outline visible over at least a significant part of the main cookware support surface and to shield electronic components, which are disposed under the layered structure, from heat radiation from the hot region.

10. The household appliance of claim 9, constructed in the form of a cooktop.

11. The household appliance of claim 9, constructed in the form of an induction cooktop.

12. The household appliance as of claim 9, wherein the material containing vanadium is a semiconductor in at least one temperature range.

13. The household appliance as of claim 12, wherein the material containing vanadium is a doped semiconductor in the temperature range.

14. The household appliance as of claim 9, wherein the material containing vanadium includes vanadium dioxide.

15. The household appliance as of claim 9, wherein the main cookware support surface is configured to at least predominantly form a cookware heating zone.

16. The household appliance as of claim 9, wherein the household appliance apparatus includes at least one upper visible unit, which is free of cooking zone markings in at least one ready-to-operate state.

17. The household appliance as of claim 9, wherein the household appliance apparatus includes at least one element containing silicon, which is connected in a material manner to the member.

18. A household appliance production method, comprising applying at least one member selected from the group consisting of a thermochromic element and thermoluminescent element to a least one component at least by sputtering, wherein the member has a first main face and at least a second main face, each of the first and second main faces at least predominantly resting against at least one further element in at least one operating state; and forming a structural element having a face which is a main cookware support surface of a cooktop for positioning a number of cookware elements, wherein the at least one further element includes a glass ceramic plate that is disposed beneath the main cookware support surface and that extends under an overall area of the main cookware support surface when viewed from above, and wherein the member is disposed beneath the glass ceramic plate and the member includes at least one material containing vanadium extending under at least fifty percent of the overall area of the main cookware support surface when viewed from above to thereby render at least part of a hot region outline visible over at least a significant part of the main cookware support surface and to shield electronic components, which are disposed under the main cookware support surface, from heat radiation from the hot region.

19. The method of claim 18 for producing a household appliance apparatus, the household appliance apparatus comprising at least one member selected from the group consisting of a thermochromic element and thermoluminescent element, said member having at least one material containing vanadium, wherein the member has a first main face and at least a second main face, each of the first and second main faces at least predominantly resting against at least one further element in at least one operating state.

20. The household appliance apparatus of claim 1, wherein the apparatus is a cooktop apparatus, wherein the main cookware support surface extends over an entire length and an entire width of the cooktop apparatus.

21. The household appliance apparatus of claim 20, wherein the member extends beneath the entire length and the entire width of the cooktop apparatus.

22. The household appliance apparatus of claim 20, wherein the member is disposed at a distance from the main cookware support surface.

23. The household appliance of claim 9, wherein the apparatus is a cooktop apparatus,
wherein the main cookware support surface extends over an entire length and an entire width of the cooktop apparatus.

24. The household appliance of claim 23, wherein the member extends beneath the entire length and the entire width of the cooktop apparatus.

25. The household appliance of claim 23, wherein the member is disposed at a distance from the main cookware support surface.

26. A household appliance comprising:
a cooktop formed by a layered unit, the layered unit including:
a main cookware support surface that extends over an entire length and an entire width of the cooktop;
a glass ceramic plate that is disposed beneath the main cookware support surface and that extends under an overall area of the main cookware support surface when viewed from above; and
at least one member including a thermochromic element or a thermoluminescent element, the member having at least one material containing vanadium,
wherein the member is disposed beneath the glass ceramic plate and the at least one material containing vanadium extends under at least fifty percent of the overall area of the main cookware support surface when viewed from above to thereby render at least part of a hot region outline visible over at least a significant part of the main cookware support surface and to shield electronic components, which are disposed under the cooktop, from heat radiation from the hot region.

27. The household appliance of claim 26, wherein the member extends beneath the entire length and the entire width of the cooktop.

28. The household appliance of claim 26, wherein the member is disposed at a distance from the main cookware support surface.

29. The household appliance of claim 26, wherein the member has a first main face and at least a second main face, the first main face at least predominantly resting against the glass ceramic plate and the second main face at least predominantly resting against a further element, wherein the further element is disposed below the member.

30. The household appliance apparatus of claim 1, wherein the at least one further element includes a second element disposed below the member, and
wherein the first main face at least predominantly rests against the glass ceramic plate and the second main face at least predominantly rests against the second element.

31. The household appliance of claim 9, wherein the at least one further element includes a second element disposed below the member, and wherein the first main face at least predominantly rests against the glass ceramic plate and the second main face at least predominantly rests against the second element.

32. The household appliance of claim 26, wherein the member is disposed beneath the glass ceramic plate and the at least one material containing vanadium extends under at least seventy percent of the overall area of the main cookware support surface when viewed from above.

33. The household appliance of claim 26, wherein the member is disposed beneath the glass ceramic plate and the at least one material containing vanadium extends under the overall area of the main cookware support surface when viewed from above.

34. The household appliance of claim 26, wherein the material containing vanadium is a semiconductor in at least a first temperature range, and wherein the material containing vanadium is a metal in at least a second temperature range to thereby shield the electronic components, which are disposed under the cooktop, from the heat radiation from the hot region.

35. The household appliance of claim 26, wherein the material containing vanadium has different thicknesses at different points.

36. The household appliance of claim 26, wherein a thickness of the material containing vanadium is in a range of 5 nm to 250 nm.

37. The household appliance of claim 26, wherein the material containing vanadium has different thicknesses at different points, and
wherein each of the different thicknesses of the material containing vanadium is in a range of 5 nm to 250 nm.

* * * * *